United States Patent
Neu et al.

(10) Patent No.: US 7,956,576 B2
(45) Date of Patent: Jun. 7, 2011

(54) RECHARGEABLE BATTERY PACKS AND RELATED METHODS

(75) Inventors: Thorben Neu, Hollywood, CA (US);
John Wadsworth, Los Angeles, CA (US); Ian Sinclair, Rochester, NY (US);
Jeff Meyers, Rochester, NY (US);
Oliver Duncan Seil, Pasadena, CA (US);
Barry P. Sween, Santa Monica, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 12/646,864

(22) Filed: Dec. 23, 2009

(65) Prior Publication Data

US 2010/0134072 A1    Jun. 3, 2010

Related U.S. Application Data

(63) Continuation of application No. 11/228,666, filed on Sep. 15, 2005, now Pat. No. 7,656,120.

(60) Provisional application No. 60/612,770, filed on Sep. 15, 2004.

(51) Int. Cl.
*H02J 7/00* (2006.01)
(52) U.S. Cl. .................. 320/114; 320/128; 320/135
(58) Field of Classification Search .................. 320/114, 320/115, 122, 125, 128, 135; 323/114, 115, 323/122, 125, 128, 135
See application file for complete search history.

(56) References Cited

U.S. PATENT DOCUMENTS

| | | | |
|---|---|---|---|
| 4,392,185 A | 7/1983 | Grossman et al. | |
| 4,553,081 A | 11/1985 | Koench | |
| 5,352,966 A | 10/1994 | Irons | |
| 5,399,956 A | 3/1995 | DeLuca et al. | |
| 5,525,888 A | 6/1996 | Toya | |

(Continued)

FOREIGN PATENT DOCUMENTS

JP    9512153    12/1997

(Continued)

OTHER PUBLICATIONS

Delphion—Derwent Record for German Application DE2909965, filed Mar. 14, 1979.

*Primary Examiner* — Adolf Berhane
*Assistant Examiner* — Nguyen Tran
(74) *Attorney, Agent, or Firm* — Bryan Cave LLP

(57) ABSTRACT

In one embodiment, a rechargeable battery pack can be configured to power an electronic device having a first battery. The rechargeable battery pack can comprise a second battery supplemental to the first battery, an external power input configured to couple to an external power source, a power output for powering the electronic device. The rechargeable battery pack can also comprise a first circuit comprising a first power path between the external power input and the power output, a second power path between the second battery and the power output, and a power switch set. When the external power source is decoupled from the external power input, the first power path is disabled by the power switch set, and the second power path is enabled by the power switch set. When the external power source is coupled to the external power input, the first power path is enabled by the power switch set, and the second power path is disabled by the power switch set. Other examples and embodiments are described herein.

27 Claims, 10 Drawing Sheets

U.S. PATENT DOCUMENTS

| | | |
|---|---|---|
| 5,733,674 A | 3/1998 | Law et al. |
| 5,786,106 A | 7/1998 | Armani |
| 5,822,427 A | 10/1998 | Braitberg et al. |
| 5,867,008 A | 2/1999 | Du et al. |
| 6,043,626 A | 3/2000 | Snyder et al. |
| 6,144,187 A | 11/2000 | Bryson |
| 6,184,654 B1 * | 2/2001 | Bachner et al. ............... 320/114 |
| 6,433,508 B1 | 8/2002 | Yang |
| 6,528,968 B2 * | 3/2003 | Seima et al. .................. 318/811 |
| 6,902,293 B2 * | 6/2005 | Tang ............................ 362/183 |
| 6,967,468 B2 | 11/2005 | Felder |
| 7,089,291 B1 | 8/2006 | Philyaw |
| 7,151,356 B1 | 12/2006 | Chen |
| 7,166,987 B2 | 1/2007 | Lee et al. |
| 7,375,492 B2 | 5/2008 | Calhoon et al. |
| 7,389,128 B2 | 6/2008 | Infanti |
| 7,408,272 B2 | 8/2008 | Marquet |
| 7,688,025 B2 | 3/2010 | Komaki et al. |
| 7,728,549 B2 | 6/2010 | Bartlett et al. |
| 7,800,167 B2 | 9/2010 | Kitamura et al. |
| 2002/0163780 A1 | 11/2002 | Christopher |
| 2002/0191421 A1 | 12/2002 | Liao et al. |
| 2003/0122523 A1 | 7/2003 | Kim et al. |

FOREIGN PATENT DOCUMENTS

| | | |
|---|---|---|
| JP | 2002034176 | 1/2002 |
| WO | WO9528789 | 10/1995 |
| WO | WO 9809418 | 3/1998 |
| WO | WO03041189 | 5/2003 |

* cited by examiner

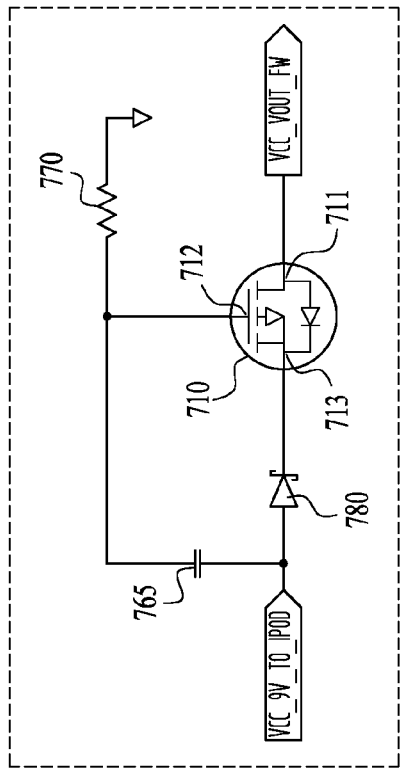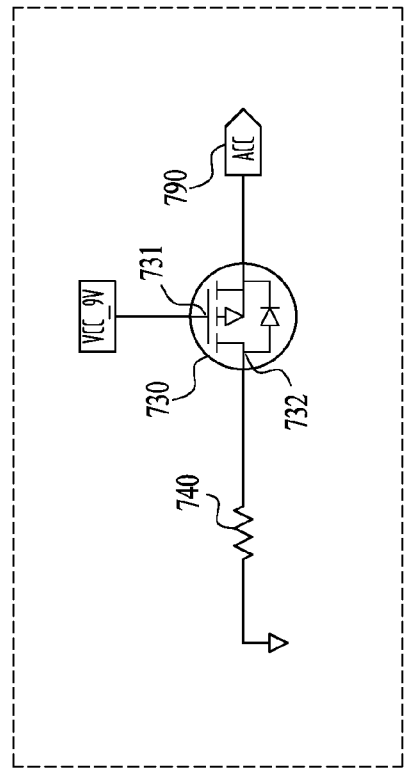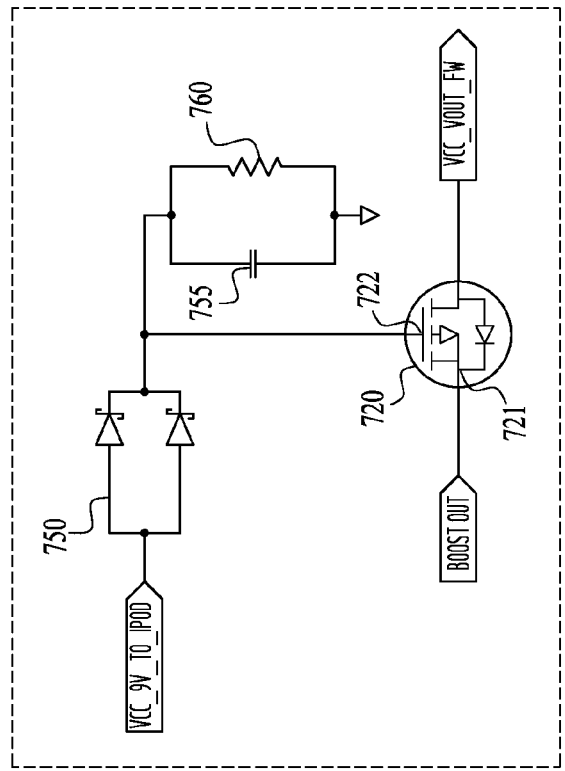

800

900

RECHARGEABLE BATTERY PACKS AND RELATED METHODS

CROSS-REFERENCE TO RELATED APPLICATIONS

This application claims priority to, and the benefit of, U.S. Provisional Application Ser. No. 60/612,770 filed Sep. 15, 2004, and titled "Power Supply System Comprising Rechargeable Battery Pack and Attachment Apparatus," which is hereby incorporated by reference.

This application is a continuation application of U.S. Utility patent application Ser. No. 11/228,666, filed Sep. 15, 2005, and titled "Power Supply System Comprising Rechargeable Battery Pack And Attachment Apparatus," which is hereby incorporated by reference.

TECHNICAL FIELD

This invention relates generally to accessories for portable electronic devices, and relates more particularly to powering and attachment accessories for portable electronic devices.

BACKGROUND

Portable electronic devices are widely used, as are accessories for such devices that are designed to complement such devices or enhance their utility. Among the available accessories are battery packs to provide supplemental power, attachment apparatuses that facilitate attaching certain accessories to the portable electronic devices, and the like.

Various electronic devices are powered by a battery within the device. Such batteries provide a limited amount of power. Thus, a need exists, under certain circumstances, for supplemental sources of power. One such supplemental source of power, which has been used, is an external power source such as an electrical power outlet that is typically not portable. However, electronic devices may not have access to power outlets at all times, and electronic devices may be used away from external power sources such as power outlets for longer than the batteries within the electronic devices are able to provide sufficient power. Further, power outlets may have power outages. Thus, a need exists for supplemental battery power for electronic devices that are portable and reliable. If more than one source of power may be used, a need exists for circuitry to control which source of power is used at a particular time, based on, for example, the power sources that are available, the power demands of the electronic devices, the level of charge of the battery within the electronic device, and the like. Needs exist for power sources to be rechargeable, and for the user to be able to determine the amount of charge that is present. Further, needs exist for sources of power and controls to be inexpensive, resistant to damage, and easy to use.

Specifically, some electronic devices that detect and identify external accessories do not do so dynamically. A single accessory that can perform the function of multiple accessories may perform better if the electronic device could detect a change in accessory, although no physical change has been made. Prior to this invention, physical intervention by the user (such as moving a switch to a different position or physically re-attaching a different accessory) was the typical way to enable a change in accessory. A scheme was needed, or would be beneficial, that didn't require physical user intervention to operate.

One method to force an electronic device to re-identify an accessory was to electronically disconnect the accessory and re-connect after some period of time, forcing the electronic device to perform the identification check again. Before reconnecting, the accessory must change the way that it electrically identifies itself. Several methods exist for electrically disconnecting the accessory, a few examples of this would be: removing power from the electronic device, or electrically removing a required accessory present signal. Electronic devices have used a variety of methods to detect and identify external accessories. These methods can include resistors, resistor dividers, capacitors, and binary signals, just to name a few.

Further, apparatuses have been used that facilitate attachment of a device to a portable electronic device having a battery. Such apparatuses have been used that have an electrical connection to the electronic device, which have included at least one plug with pins. However, forces applied to the plug have damaged the pins. Consequently, a need or potential benefit exists for an attachment apparatus shaped to prevent potentially harmful forces from being applied to a plug, or to limit movement of a plug or electrical connection, for example, in a manner that protects the plug, electrical connection, or pins from damage.

Other needs and potential for improvement will be apparent from this disclosure or are know to those of skill in the art. Particular embodiments of the present invention may partially or completely fulfill one or more of these needs, or may provide other benefits which may or may not be readily apparent.

BRIEF DESCRIPTION OF THE DRAWINGS

The invention will be better understood from a reading of the following detailed description, taken in conjunction with the accompanying figures in the drawings in which:

FIGS. 7a, 7b, and 7c are circuit diagrams illustrating a circuit capable of dynamically switching an electronic device between a first state and a second state depending on a status of the rechargeable battery pack of FIGS. 1 and 2 according to an embodiment of the invention;

Figure 1:
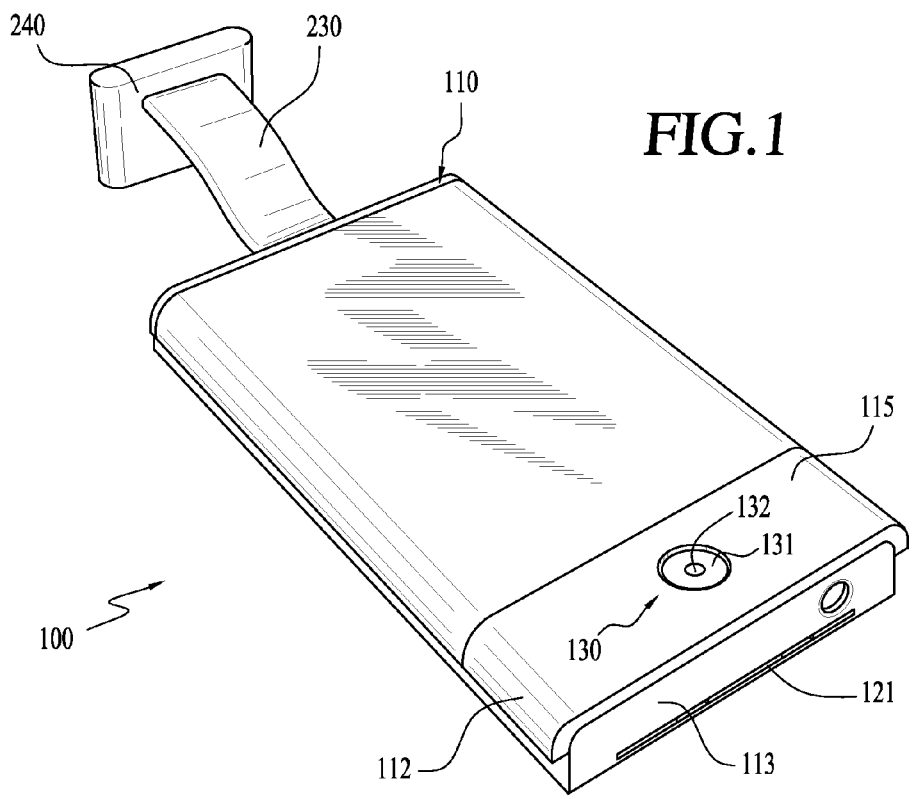
FIG. 1 is a perspective view of a rechargeable battery pack according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DESCRIPTION OF EXEMPLARY EMBODIMENTS

Various embodiments of the present invention include a rechargeable battery pack capable of providing electric power to an electronic device having a first battery. In several embodiments the rechargeable battery pack has a body with a second battery inside for storing electrical energy. In some embodiments, the rechargeable battery pack may have a circuit inside the body capable of dynamically changing a charge current supplied from an external power source to the second battery based on a power consumption level of the electronic device. In some embodiments, the battery pack may include a circuit inside the body configured to: (1) power the electronic device with the second battery when the rechargeable battery pack is electrically coupled to the electronic device and when electrically decoupled from the external power source; and (2) power the electronic device with the external power source when the rechargeable battery pack is electrically coupled to the external power source and the electronic device. In some embodiments, the rechargeable battery pack may have a charge level indicator, examples of which are described in more detail below.

Further, some embodiments of the invention may include an attachment apparatus for attaching the rechargeable battery pack to the electronic device. As an example, the attachment apparatus may comprise a frame, an extension protruding from the frame, and a number of attachment features suitable for working with the recesses to attach the battery pack and the attachment apparatus to each other and to the electronic device. Such an attachment apparatus may include a number of sides, some of which may have openings, and the attachment apparatus may further have an extension protruding from one side. This extension may surround or substantially surround an opening in the side, and may protect a disconnectable electrical connection of the rechargeable battery pack that fits inside the extension. Some embodiments of the invention include a combination of these features or one or more of these features in combination with other features described herein.

In one particular embodiment of the invention, a power supply system capable of providing electric power to an electronic device having a first battery comprises a battery pack and an attachment apparatus. The battery pack comprises a body having a number of recesses, a second battery inside the body, and at least one of: (1) a first circuit capable of dynamically changing a magnitude of a charge current supplied to the second battery based on a power consumption level of the electronic device; and (2) a second circuit capable of dynamically switching the second battery, depending on a status of the battery pack, between: (a) a state in which the second battery is not being drained, i.e., is not being used as a power source; and (b) a state in which the second battery is being drained, i.e., is being used as a power source. The state described in (a) will be referred to herein as a first state, and the state described in (b) will be referred to herein as a second state. In this embodiment, when the battery pack is electrically coupled to the electronic device, the electronic device will draw power from the second battery in the battery pack and will not draw power from the first battery in the electronic device until after the second battery is depleted.

As used herein, the term "dynamically" means automatically and in substantially real time. In other words, "dynamically" means accomplished in response to one or more changing variables (other than time) without human interaction, and without a significant delay. "Dynamically" does not include actions that are initiated by human interaction or actions that occur at one or more timed intervals. Also as used herein, the term "state", as applied to a battery, may indicate whether (or not) the battery is being drained. As an example, the first state of the second battery may be a state in which the second battery is not being drained, i.e., is not being used as a power source, and the second state may be a state in which the second battery is being drained, i.e., is being used as a power source.

Further, as used herein, the "status" of a battery pack may include whether the battery pack is electrically coupled to an external power source. For instance, the status of a battery pack can be one of a first condition when the battery pack is electrically coupled to an external power source such as a wall outlet, or the status of a battery pack can be a second condition when the battery pack is electrically decoupled to the external power source. In some embodiments where the battery pack is electrically coupled to the electronic device, for example, the second circuit may automatically and dynamically switch the second battery to the first state (i.e., not used as a power source) when, after, or while the status of the battery pack is changed from the second condition to the first condition (i.e., coupled to the external power source), and the second circuit may automatically and dynamically switch the second battery to the second state (i.e., used as a power source) when, after, or while the status of the battery pack is changed from the first condition to the second condition (i.e., decoupled from the external power source).

As mentioned, various embodiments of the invention may include an attachment apparatus. In some embodiments, the attachment apparatus comprises a frame, an opening in the frame, and an extension adjacent to the opening. In some particular embodiments of the attachment apparatus, the extension protrudes from the frame. Further, in some embodiments, and the attachment apparatus includes a number of attachment features suitable for working with or engaging recesses in the body of the battery pack to attach the battery pack and the attachment apparatus to each other and to the electronic device.

Additional embodiments of the invention include methods of manufacturing the devices described herein, which include providing various combinations of components described in this document or know in the art. Other embodiments of the invention also include methods of using the devices described herein. Certain embodiments of the invention also include various combinations of functions, including those described herein, and particular combinations of functions and structure.

Figure 2:
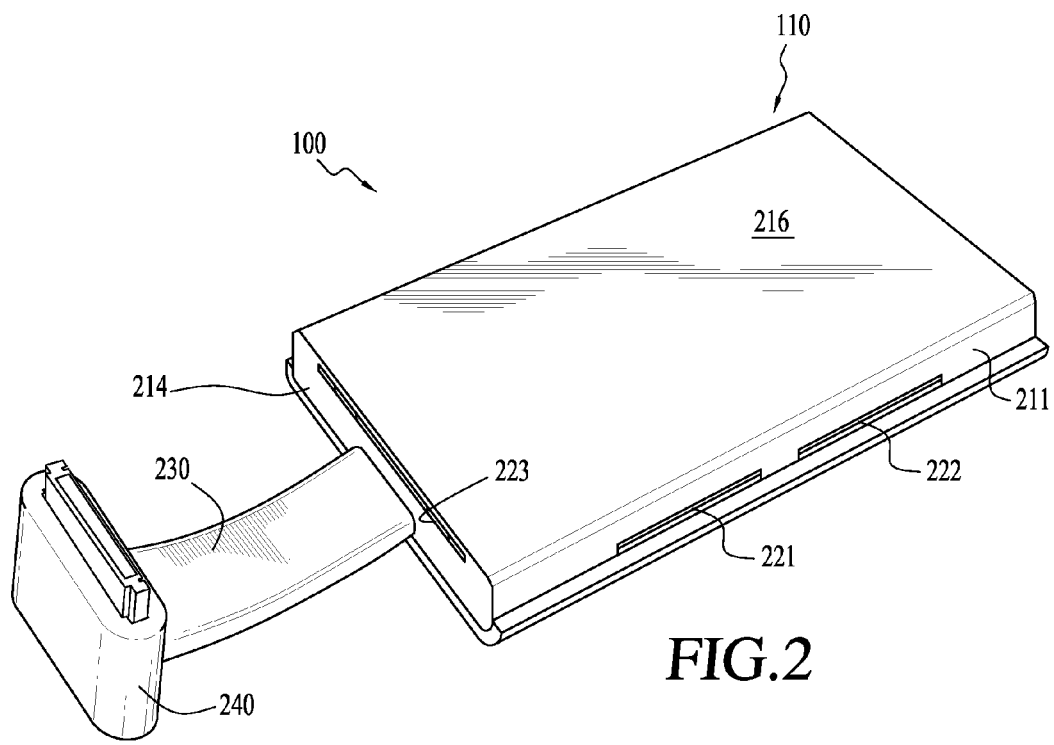
FIG. 2 is a perspective view of a different side of the rechargeable battery pack of FIG. 1, viewed from a different angle.

Referring now to the figures, FIGS. 1 and 2 are perspective views of a rechargeable battery pack 100 capable of providing electric power to an electronic device (not shown) having a first battery (not shown), according to an example of an embodiment of the invention. As illustrated in FIGS. 1 and 2, rechargeable battery pack 100 comprises a body 110, and body 110 comprises a surface 112, a surface 113, a surface 115, a surface 211, a surface 214, and a surface 216. In the embodiment illustrated, surface 112 is located opposite surface 211, and is substantially parallel thereto. Surface 113 extends between and is substantially perpendicular to surfaces 112 and 211. Surface 214 is located opposite and is substantially parallel to surface 113. Surface 115 extends between surfaces 211 and 112, extends between surfaces 113 and 214, and is substantially perpendicular to each of those surfaces. Finally, surface 216 is located opposite and is substantially parallel to surface 115. In other words, as can be seen in the figures, in this particular embodiment, body 110 forms a rectangular box, with surfaces 115 and 216 having substantially more area than the other four surfaces. It is possible that in another embodiment, body 110 could have some other configuration. Body 110 can be formed of a polycarbonate material, or of a material that is a blend of polycarbonate and acrylonatrile butadeine styrene (ABS), as examples.

In the embodiment illustrated, Surface 211 comprises a recess 221 and a recess 222. Although they are not visible in the figures, surface 112 comprises its own recesses that are analogous to recess 221 and 222. Similarly, surface 113 comprises a recess 121, and surface 214 comprises a recess 223. As further discussed below, in the particular embodiment illustrated, these recesses are used when rechargeable battery pack 100 is attached to the attachment apparatus mentioned above, which attachment apparatus facilitates the attachment of rechargeable battery pack 100 to an electronic device, as will also be further discussed below.

Still referring to FIGS. 1 and 2, in the embodiment illustrated, body 110 further comprises a charge level indicator 130, comprising an actuator button 131, a light pipe 132, and, not explicitly illustrated in the figures, first and second light sources inside body 110. In a particular embodiment, the first light source emits a green light when illuminated, and the second light source emits a red light when illuminated. Accordingly, in the description that follows, the first light source will also be referred to as a green light source, and the second light source will also be referred to as a red light source. It should be understood, however, that different embodiments of rechargeable battery pack 100 may use colors different from those that are described here. In this particular embodiment, both light sources are visible through light pipe 132. Thus, if both light sources are illuminated at the same time, the light from both light sources is simultaneously visible through light pipe 132.

Figure 9:
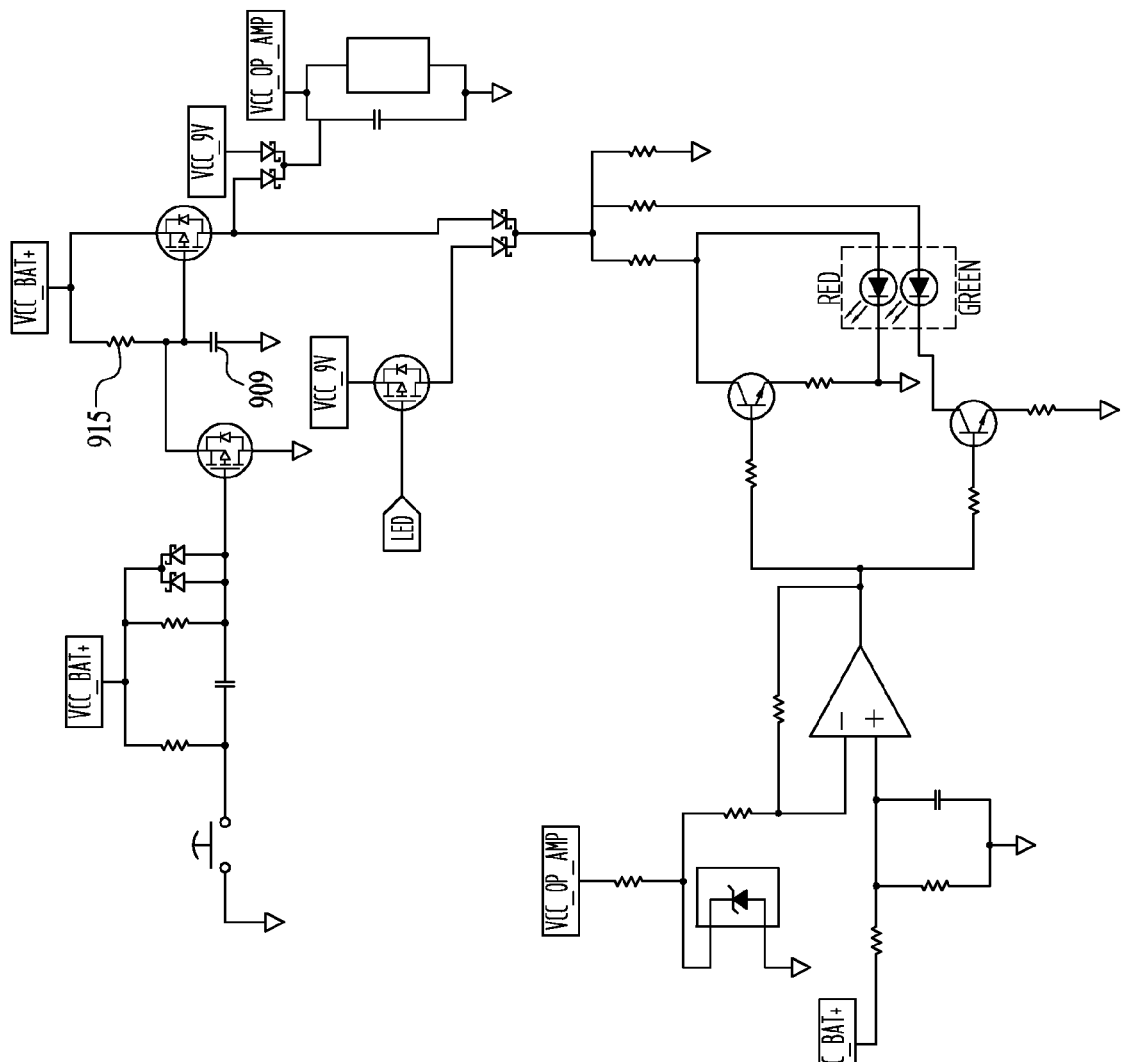
FIG. 9 is a circuit diagram illustrating an LED gas gauge circuit according to an embodiment of the invention.

In one embodiment, actuator button 131 is of the pushbutton variety, and is actuated by a physical press and release. In another embodiment, actuator button 131 can be an electrostatic device that is actuated by a touch rather than a physical movement of actuator button 131 itself. Additional mechanical or non-mechanical actuator button styles may be used in some embodiments. Charge level indicator 130 may include a circuit, and actuator button 131 may be part of that circuit. Charge level indicator 130 or the circuit therefore may be referred to as a "gas gauge." An example of a charge level indicator circuit or gas gauge is illustrated in FIG. 9 and described below with reference thereto.

Still referring to FIGS. 1 and 2, various embodiments of the invention may include part or all of a disconnectable electrical connection, for example, between a battery pack and an electrical device. In the embodiment illustrated in FIGS. 1 and 2, rechargeable battery pack 100 comprises an electric cable 230, and a dock connector 240. Dock connector 240 or part thereof is an example of an electrical connection between battery pack 100 and another device. Dock connector 240 may be capable of being electrically coupled to the electronic device, thus providing an electrical connection between the electronic device and rechargeable battery pack 100 or another device. In some embodiments, electric cable 230 and dock connector 240 conducts electric signals, transmits electrical power, or both (sequentially and/or simultaneously), between the electronic device and a second battery within rechargeable battery pack 100.

In many embodiments, rechargeable battery pack 100 still further comprises a second battery (not shown) inside body 110. In various embodiments of the invention, body 110 may also contain one or more circuits, examples of which are described below with reference to FIGS. 6-13, but first, examples of an attachment apparatus in accordance with the present invention will be described.

Figure 3:
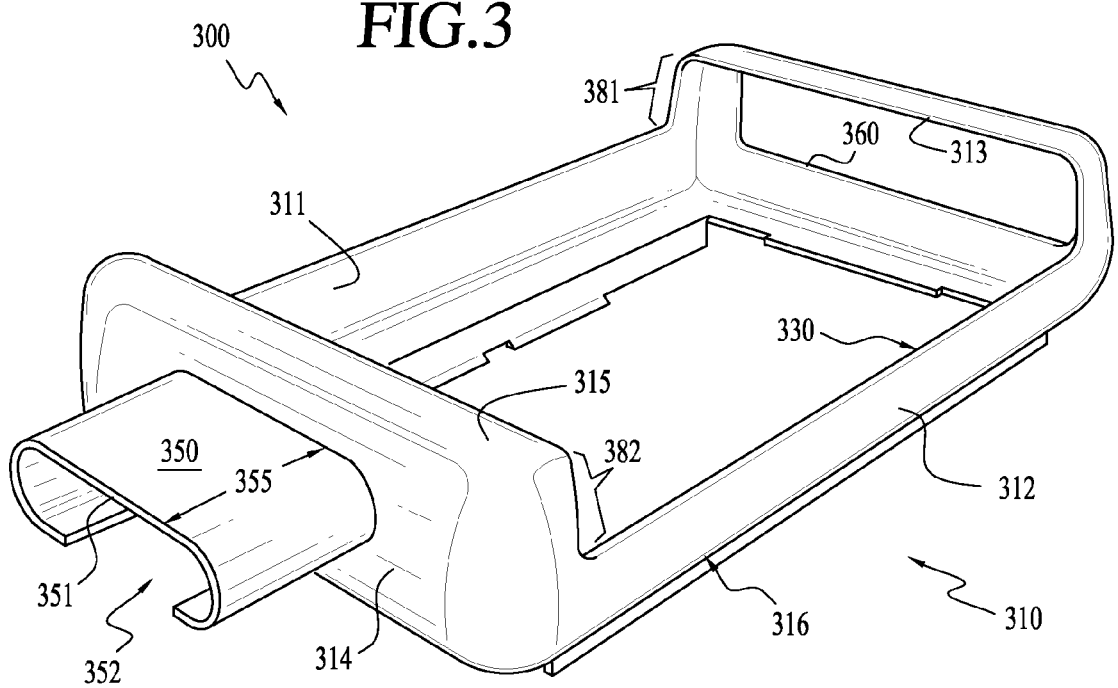
FIG. 3 is a perspective view of an attachment apparatus capable of attaching a first device to a portable electronic device having a first battery according to an embodiment of the invention.
Figure 4:
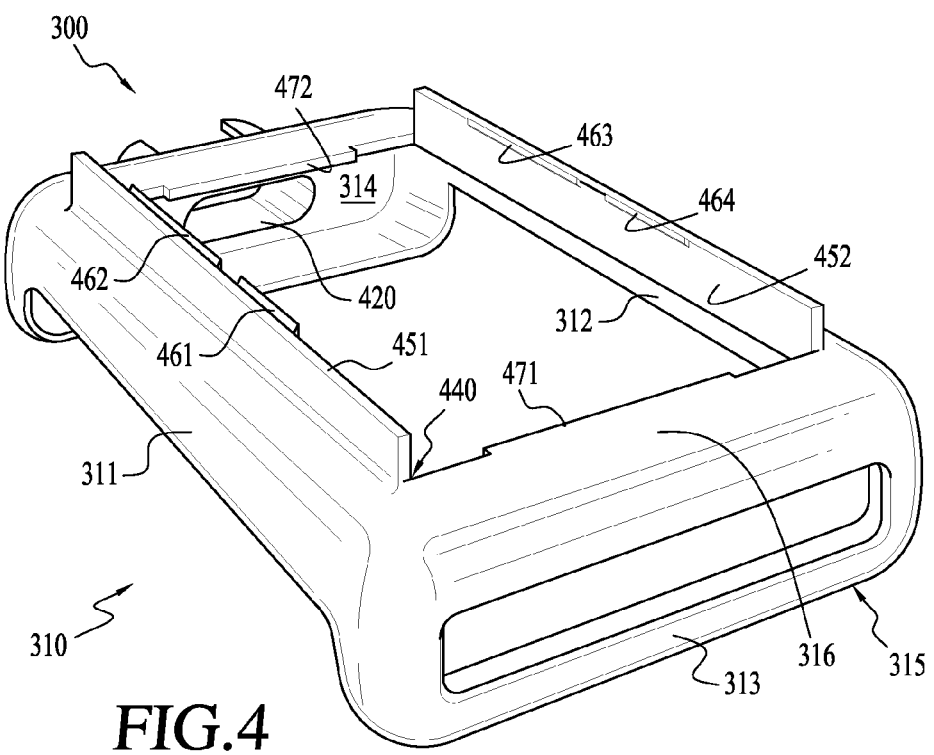
FIG. 4 is a perspective view of a different side of the attachment apparatus of FIG. 3, viewed from a different angle.

Illustrating a specific example of the invention, FIGS. 3 and 4 are perspective views of an attachment apparatus 300 capable of attaching a first device to a portable electronic device (not shown) having a first battery (not shown). The portable electronic device may be similar to what has been referred to above as the electronic device, and the first battery may be the same as or similar to what was referred to above as the first battery. The first device can be a battery pack, a speaker, or another hardware device, a memory device, a mounting accessory, or the like. In a particular embodiment, the first device is rechargeable battery pack 100 from FIGS. 1 and 2. The portable electronic device can be a device that is configured to play audio recordings, such as an MP3 player, a CD player, a digital camera, a pocket PC (personal computer), a cellular telephone, or the like. In some embodiments, attachment apparatus 300 may attach to the first device and the electronic device, and may hold them in a particular orientation relative to each other.

As illustrated in FIGS. 3 and 4, for the purpose of describing an example of the invention, attachment apparatus 300 comprises a hollow frame 310 comprising a side 311, a side 312 opposite and substantially parallel to side 311, a side 313 extending between and substantially perpendicular to the side 311 and side 312, a side 314 opposite and substantially parallel to side 313, a side 315 extending between and substantially perpendicular to side 311 and side 312, and further extending between and substantially perpendicular to the side 313 and side 314, and a side 316 opposite and substantially parallel to side 315. In this particular embodiment, side 314 defines an opening 420, side 315 defines an opening 330, and side 316 defines an opening 440. Opening 330 receives the portable electronic device, and opening 440 receives the first device.

In some embodiments, including the one illustrated, attachment apparatus 300 further comprises an extension 350 protruding from side 314, and rails 451 and 452 adjacent to an opposite side of opening 440. Extension 350 at least partially surrounds opening 420, and may serve to protect and prevent damage to an item inserted through extension 350 and opening 420. Such an item may be, for example, a power cord, which may include a disconnectable electrical connection between the battery pack and the electronic device. Dock connector 240 described herein with reference to FIG. 2 is one example of such a connection. Such an electrical connection may fit inside extension 350. Extension 350 may serve to protect and prevent damage to the portable electronic device, and in particular, to a connector, such as a female connector, for instance, of the portable electronic device. In that regard, extension 350 prevents a mating connector, such as a male connector, such as connector 240, from moving from side to side. Accordingly, as an example, connector 240 may be prevented from bending to the degree that the female connector or other component of the portable electronic device is damaged. In some embodiments, opening 420 has an oblong or elliptical shape, and extension 350 surrounds opening 420 on at least three sides. In some embodiments, extension 350 comprises a perimeter 351 having a gap 352 therein. In various embodiments, gap 352 can extend along an entire height 355 of extension 350, as illustrated in FIG. 3, or, alternatively, gap 352 can extend along only a portion of height 355.

In some embodiments, rail 451 comprises attachment features 461 and 462, and rail 452 comprises attachment features 463 and 464. The first device may fit between rails 451 and 452, and may be held in place by attachment features 461-664. In one embodiment, attachment feature 461 comprises a lip or protrusion extending toward rail 452, and attachment feature 463 comprises a lip or protrusion extending toward rail 451. Attachment features 462 and 464 can be similar to, respectively, attachment features 461 and 463.

In some embodiments, attachment apparatus 300 still further comprises an attachment feature 471 and an attachment feature 472, both of which may be adjacent to opening 440. In one embodiment, attachment feature 471 and/or attachment feature 472 comprise a lip or protrusion extending into opening 440. In the illustrated embodiment, recesses 221, 222, 121, and 223 (FIGS. 1 and 2) receive, respectively, attachment features 463, 464, 471, and 472. Attachment features 461 and 462 are received by the recesses on surface 112 (FIG. 1) that are not visible in the figures but that are analogous to recesses 221 and 222.

Referring still to FIGS. 3 and 4, in the particular embodiment illustrated, side 313 comprises an opening 360, which exposes a first portion of the portable electronic device when the portable electronic device is attached to or located within attachment apparatus 300. As an example, opening 360 may allow access to a control, a port, or the like that may be located at the first portion of the portable electronic device. Similarly, in the embodiment illustrated, side 311 comprises a cutout 381, and side 312 comprises a cutout 382, both of which may expose a second portion of the portable electronic device when the portable electronic device is attached to attachment apparatus 300. In some embodiments, cutouts 381 and 382 allow the portable electronic device to more easily be attached to and removed from attachment apparatus 300.

Figure 5:
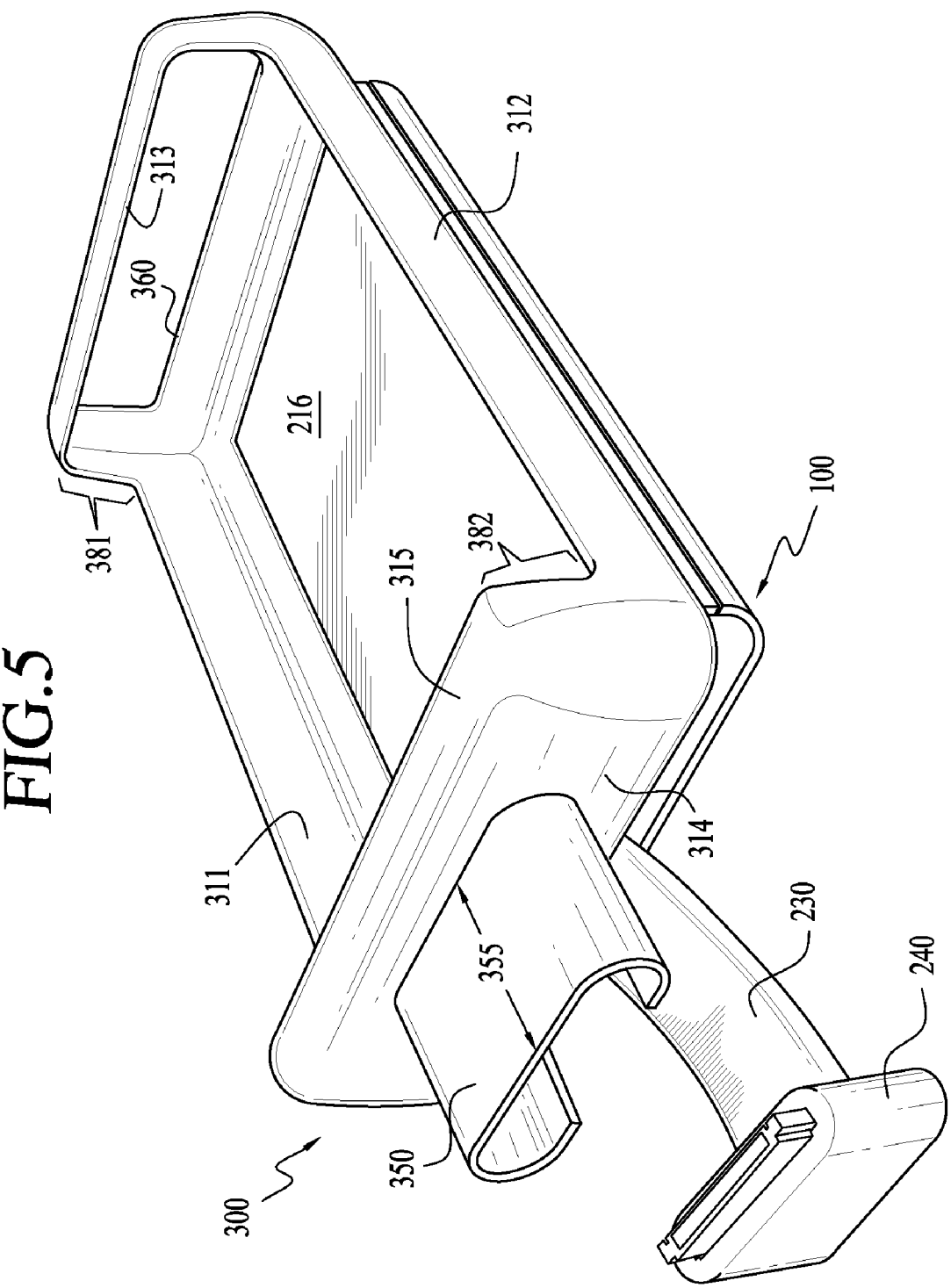
FIG. 5 is a perspective view showing the rechargeable battery pack of FIGS. 1 and 2 attached to the attachment apparatus of FIGS. 3 and 4, according to an embodiment of the invention.

FIG. 5 is a perspective view showing rechargeable battery pack 100 attached to attachment apparatus 300, according to an embodiment of the invention, thus forming a power supply system capable of providing electric power to an electronic device such as or similar to those enumerated or referred to herein. Attachment apparatus 300 may be formed of a low-density polyethylene (LDPE), as an example, which may give attachment apparatus 300 a clean and white translucent appearance, a non-tacky feel, and an appropriate degree of malleability, meaning it is flexible enough to bend to allow the first device and the portable electronic device to be attached and detached, but still has enough rigidity to allow the attachment features to perform or operate properly.

In a particular embodiment, the electronic device is configured to play audio recordings, such as an MP3 player, and may be an iPod™ device manufactured by Apple Computer, Inc. of Cupertino, Calif., for example. Different sizes or configurations of attachment apparatus 300 or frame 310 may be provided for different size electronic devices or iPod™ devices. A user may install battery pack 100 within attachment apparatus 300, and then install the electronic device within attachment apparatus 300, or vice versa. The electronic device, battery pack 100, or both, may be installed in attachment apparatus 300 by inserting one end first, and then the other end. For example, the bottom may be inserted first, then the top. The user may check that tabs are inserted into slots, as described herein. The user may then plug dock connector 240 into the electronic device, which may include sliding dock connector 240 within extension 350.

Once connected with dock connector 240, the electronic device may run off of battery pack 100 instead of the first battery, as long as there is enough power in battery pack 100. Thus, battery pack 100 may extend the amount of time that the electronic device will operate without being charged. In a particular embodiment, battery pack 100 allows the electronic device (an iPod™ device in some embodiments) to play for an additional 8 to 10 hours, for example. In embodiments so equipped, a user may check the amount of charge left in battery pack 100 by pressing actuator button 131 and viewing the color of light indicating the battery status, for example, as described herein.

As mentioned above, in various embodiments of the invention, body 110, illustrated in one embodiment in FIG. 1, may also contain various circuits. Two examples of such circuits are: (a) a first circuit capable of dynamically changing a magnitude of a charge current supplied to the second battery from an external power source based on a power consumption level of the electronic device; and (b) a second circuit capable of dynamically switching the second battery between a first state and a second state depending on a status of the rechargeable battery pack. Examples of both the first circuit and the second circuit will be further described below.

Figure 12:
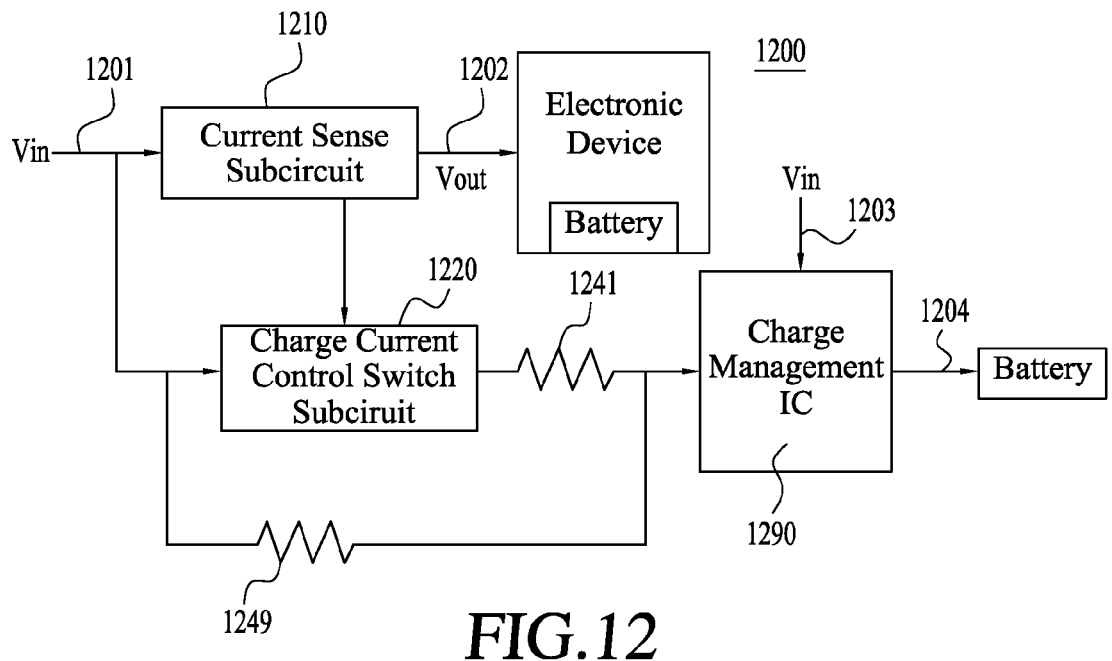
FIG. 12 is a block diagram illustrating a circuit capable of setting and dynamically changing a charge current supplied to a battery inside a body of the rechargeable battery pack of FIGS. 1 and 2, according to an embodiment of the invention.
Figure 13:
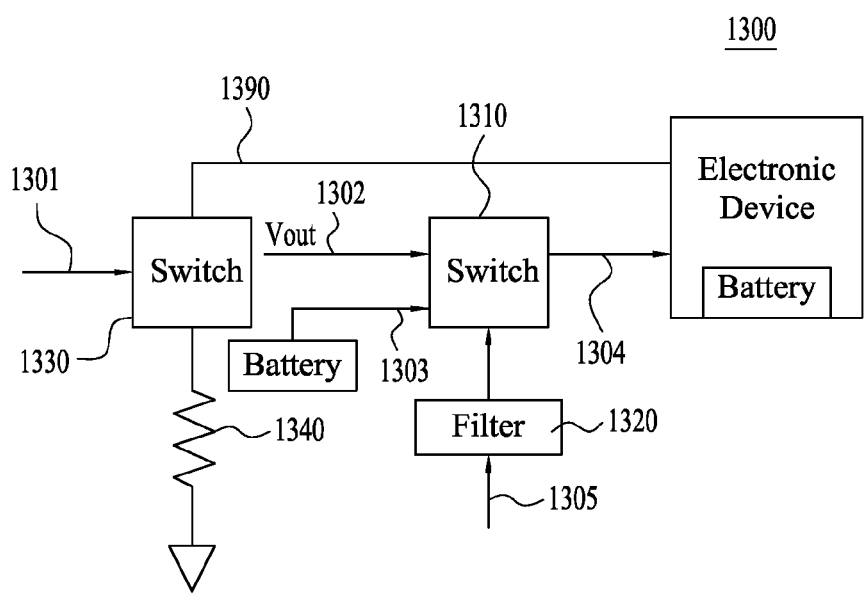
FIG. 13 is a block diagram illustrating a circuit capable of dynamically switching the second battery between a first state and a second state, according to an embodiment of the invention.

Skipping forward to FIGS. 12 and 13, FIG. 12 illustrates a block diagram of a circuit 1200, which is an example of the first circuit, and FIG. 13 illustrates a block diagram of a circuit 1300, which is an example of the second circuit. In FIG. 12, circuit 1200 may be capable of dynamically changing a charge current supplied to a battery inside body 110 of rechargeable battery pack 100 (FIGS. 1 and 2) according to an embodiment of the invention. Circuit 1200 is also capable of setting a battery charge current for the battery inside the body of the rechargeable battery pack, according to an embodiment of the invention. The battery inside body 110 was introduced above, and will continue to be referred to herein, as the second battery. In this particular embodiment, circuit 1200 dynamically changes the magnitude of the charge current supplied to the second battery from an external power source based on a power consumption level of an electronic device to which rechargeable battery pack 100 is electrically coupled. Recall from above that the electronic device may have its own internal battery, introduced above and referred to herein as the first battery. In particular embodiments of the present invention, the charge current charges the second battery in the manner described herein.

In some embodiments when rechargeable battery pack 100 is electrically coupled to the electronic device and also to an external power source, circuit 1200 may facilitate a smooth integration between the electronic device and rechargeable battery pack 100 (FIG. 1) and may also permit the external power source to efficiently charge the second battery while simultaneously operating the electronic device. In this manner, circuit 1200 eliminates the need to completely charge the first battery of the electronic device before charging the second battery. More specifically, circuit 1200 can route to the electronic device whatever current is needed to operate the electronic device, and can route any extra current (i.e., the charge current) to rechargeable battery pack 100 for the charging of the second battery. When the electronic device draws relatively less current, relatively more current may be available from the external power source to recharge the second battery via circuit 1200, and when the electronic device draws relatively more current, relatively less current may be available from the external power source via circuit 1200 to recharge the second battery. In some embodiments, when the external power source is coupled to battery pack 100, circuit 1200, which is located within battery pack 100, may transmit the charge current to the second battery even if the second battery is already fully charged.

It should be understood that in some embodiments, the external power source that is used to charge rechargeable battery pack 100 may have pre-determined power limits that, if exceeded, could cause damage to the external power source, to rechargeable battery pack 100, and/or to the electronic device. By dynamically switching the charge current to rechargeable battery pack 100, the electronic device can be charged normally and remain unaffected by unexpected power fluctuations from the external power source.

As illustrated in FIG. 12, circuit 1200 comprises many elements, including a Vin input 1201, which is electrically coupled to an input of a current sense subcircuit 1210 and an input of a charge current control switch subcircuit 1220. Subcircuit 1210 is electrically coupled to another input of subcircuit 1220, and subcircuit 1210 has a Vout output 1202, which is connected to an input of the electronic device when rechargeable battery pack 100 (FIG. 1) is electrically coupled to electronic device. A resistor 1241 is electrically coupled to an output of subcircuit 1220 and to at least one input of a charge management integrated circuit ("IC") or chip 1290. A resistor 1249 is electrically coupled, at one end, between input 1201 and the input to subcircuit 1220 and, at the other end, between resistor 1241 and the input of chip 1290. In this configuration, resistor 1249 is a feedback resistor for subcircuit 1220. A Vin input 1203 is electrically coupled to at least one other input of chip 1290. Chip 690 has a Vout output 1204, which is electrically coupled to the second battery.

In one embodiment, chip 1290 is a two-cell charge management IC sold by Texas Instruments, Inc. of Dallas, Tex. under part number BQ24004. In this embodiment, resistors 1241 and 1249 are electrically coupled in parallel to pins 2, 3, 5 of chip 1290, and input 1203 is electrically coupled to pins 4, 8, and 9 of chip 1290. In different embodiments, other battery charge management ICs may be used instead. Furthermore, in the same or different embodiments, inputs 1201 and 1203 can be at the same voltage potential.

Circuit 1200 is an example of a circuit that may dynamically change a charge current supplied from an external power source to a second battery based on a power consumption level of the electronic device. In the embodiment of circuit 1200 illustrated, current sense circuit 1210 may detect or measure current to Vout 1202, for example, to the electronic device. Based on what this current is, current sense circuit 1210 may send a signal to current control switch 1220, for example, indicating whether to open or close. Current control switch 1220 may close so that current can flow through both resistor 1249 and resistor 1241 in parallel, or switch 1220 may open, so that current can flow only through resistor 1249 and not through resistor 1241.

In a particular embodiment, when rechargeable battery pack 100 is connected to an external power source and the current draw of the electronic device is high, switch 1220 is off (open). Thus, the charge current going to the second battery is routed by circuit 1200 through resistor 1249 only, thus increasing the voltage across this resistor and decreasing the amperage or magnitude of the charge current. When the current draw of the electronic device is low, switch 1220 is on (closed) in this embodiment, allowing more charge current to pass through resistors 1241 and 1249 in parallel. Thus, voltage across resistors 1241 and 1249 is decreased and the amperage or magnitude of the charge current is increased such that the second battery receives a greater charge and takes a relatively shorter amount of time to fully charge. In some embodiments, the second battery is being charged whenever rechargeable battery pack 100 is connected to an external power source. Thus, the second battery may be charged in one of two states: either a fast charge mode or a slow or low charge mode.

In some embodiments, chip 1290 may dynamically detect a change in current sense circuit 1210, for example, and may set the charge rate to fast or slow, for instance.

Turning to the next figure, FIG. 13 illustrates a block diagram of circuit 1300, which, as indicated earlier, is an example of the second circuit. Accordingly, circuit 1300 is capable of dynamically switching the second battery between a first state (where the second battery is not being drained and is not being used as a power source by the electronic device) and a second state (where the second battery is being drained and is being used as a power source by the electronic device). For instance, rechargeable battery pack 100 (FIG. 1) may be capable of being electrically coupled to and decoupled from an external power source, such as a power port on a computer or a wall outlet capable of supplying alternating current (AC), which may be reduced to a lower voltage, converted to direct current (DC) or both. In a particular embodiment, circuit 1300 may be configured to facilitate powering the electronic device with the second battery when rechargeable battery pack 100 (FIG. 1) is electrically decoupled from the external power source and is electrically coupled to the electronic device. In this same embodiment, circuit 1300 may be configured to facilitate powering the electronic device with the external power source when rechargeable battery pack 100

(FIG. 1) is electrically coupled to the external power source and the electronic device. Thus, despite being electrically coupled to the electronic device, the second battery may be in a state of not being used as a power source when rechargeable battery pack 100 (FIG. 1) is electrically coupled to the external power source.

Referring still to circuit 1300 in FIG. 13, in various embodiments, the second battery may be used as a power source when the second battery is in the second state, and the second battery may not be used as a power source when the second battery is in the first state. The status of rechargeable battery pack 100 (FIG. 1) may be one of: a first condition in which rechargeable battery pack 100 is electrically coupled to the external power source; and a second condition in which rechargeable battery pack 100 is electrically decoupled from the external power source. In some embodiments where the rechargeable battery pack 100 is electrically coupled to the electronic device, circuit 1300 places the second battery in the first state when rechargeable battery pack 100 is in the first condition, and circuit 1300 places the second battery in the second state when rechargeable battery pack 100 is in the second condition.

In summary of the above, in a particular embodiment, when rechargeable battery pack 100 is electrically coupled to the external power source and to the electronic device, circuits 1200 (FIG. 12) and 1300 (FIG. 13) cause the electronic device to charge its internal battery, which is the first battery, using a charge current that only exists when rechargeable battery pack 100 is electrically coupled to the external power source and to the electronic device. On the other hand, when rechargeable battery pack 100 is not electrically coupled to the external power source, but is electrically coupled to the electronic device, circuits 1200 (FIG. 12) and 1300 (FIG. 13) causes the electronic device to draw power from the second battery. Thus, circuit 1200 can be used in a complimentary manner with circuit 1300, and vice versa. Circuit 1200 may be used to determine how quickly to recharge the second battery within rechargeable battery pack 100 from an external power source, and circuit 1300 may be used to determine whether or not to use the second battery within rechargeable battery pack 100 as a power source for the electronic device. On the other hand, some embodiments of the invention may include just one of these circuits.

As illustrated in FIG. 13, circuit 1300 comprises many elements, including switches 1310 and 1330 and a filter 1320. Switch 1330 has an "identify control" input 1301 and an output 1390, which is coupled to an identification input of the electronic device. A resistor 1340 can be coupled between a terminal of switch 1330 and a ground potential. Switch 1330 can be used to notify the electronic device that rechargeable battery pack 100 (FIG. 1) is electrically coupled to the electronic device. In one embodiment, input 1301 can be at the same voltage potential as inputs 1201 and 1203 in FIG. 12.

Switches 1310 have a Vout input 1302 and a Boost Out input 1303. In one embodiment of circuit 1300, a first one of switches 1310 has input 1302, and a second one of switches 1310 has input 1303. Input 1302 represents the power input from the external power source, and input 1303 represents the power input from the second battery of rechargeable battery 100 (FIG. 1). A filter 1320 is electrically coupled between terminals of switches 1310 and a Vout input 1305. In one embodiment, input 1305 can be at the same voltage potential as input 1302. Switches have outputs 1304, which are electrically coupled to one or more inputs to the electronic device.

Figure 6:
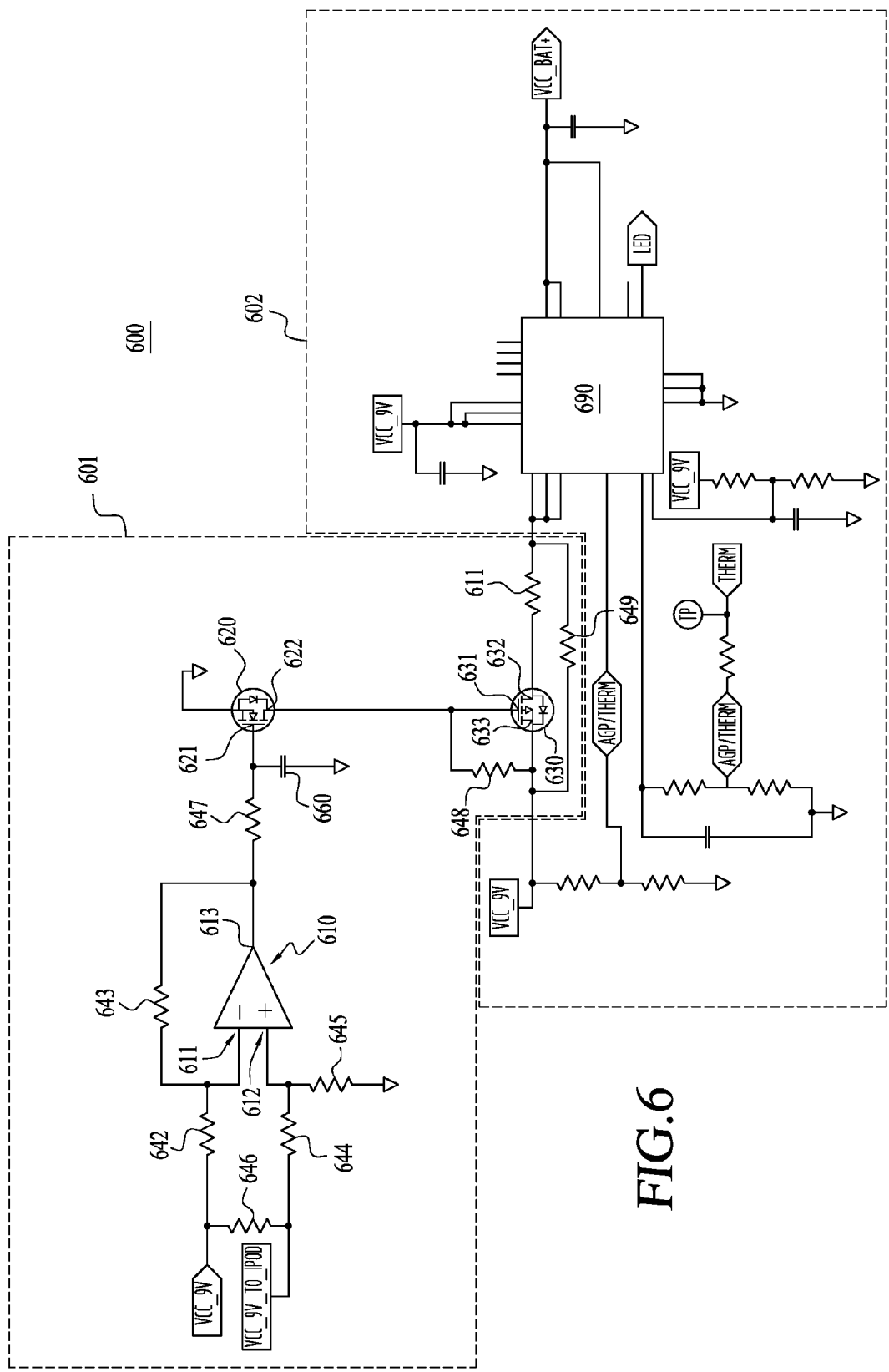
FIG. 6 is a circuit diagram of the block diagram in FIG. 11, according to an embodiment of the invention.

Skipping back to FIG. 6, FIG. 6 is a circuit diagram illustrating a circuit 600, which may be an embodiment of the block diagram circuit 1200 in FIG. 12. As illustrated in FIG. 6, in this embodiment, circuit 600 comprises an operational amplifier 610 having an inverting input 611, a non-inverting input 612, and an output 613. Circuit 600 further comprises, in the embodiment illustrated, an inverter 620 having a terminal 621 electrically coupled to output 613, a power limiting switch 630 having a terminal 631 electrically coupled to a terminal 622 of inverter 620, and a resistor 641 electrically coupled to a terminal 632 of power limiting switch 630. In some embodiments, power limiting switch 630 dynamically directs a current in circuit 600 such that the current in circuit 600 either travels through or bypasses resistor 641 based on the power consumption level of the electronic device. In the embodiment shown, power limiting switch 630 comprises at least one transistor, such as a field effect transistor having gate, source, and drain terminals.

Referring still to FIG. 6, in the embodiment illustrated, circuit 600 further comprises a resistor 642 and a resistor 643 electrically coupled to inverting input 611, a resistor 644 and a resistor 645 electrically coupled to non-inverting input 612, and a resistor 646 electrically coupled to resistor 642 and to resistor 644. In this particular embodiment, circuit 600 still further comprises a resistor 647 electrically coupled between output 613 and terminal 621 of inverter 620, a capacitor 660 electrically coupled between resistor 647 and terminal 621 of inverter 620, a resistor 648 electrically coupled to terminal 631 of power limiting switch 630 and to a terminal 633 of power limiting switch 630, and a resistor 649 electrically coupled to resistor 648 and to resistor 641. In some embodiments, resistors 642, 643, 644, 645, and 646, as well as operational amplifier 610 may form a current sense block. In a particular embodiment, resistor 642 has a resistance of 10 K ohms, resistor 646 has a resistance of 0.22 ohms, resistor 644 has a resistance of 200 ohms, resistor 643 has a resistance of 976 K ohms, resistor 645 has a resistance of 200 K ohms, resistor 647 has a resistance of 5.1 M ohms, resistor 648 has a resistance of 220 K ohms, resistor 641 has a resistance of 0.18 ohms, and resistor 649 has a resistance of 1.0 ohms, for example. In such an embodiment, capacitor 660 may have a capacitance of 0.1 micro Farads.

In some embodiments, the current draw of the electronic device may be measured and fed into operational amplifier 610, which may turn power limiting switch 630 on or off depending on the magnitude of the current draw. In a particular embodiment, when rechargeable battery pack 100 is connected to an external power source and the current draw of the electronic device is high, power limiting switch 630 is off (open). Although rechargeable battery pack 100 may still be connected to an external power source, the charge current cannot pass through resistor 641, and is limited to the current that flows through resistor 649, Thus, the voltage across resistor 649 is increased and the amperage or magnitude of the charge current is decreased such that the second battery receives only a trickle charge and takes a relatively longer amount of time to fully charge. When the current draw of the electronic device is low, power limiting switch 630 is on (closed) in this embodiment. Thus, the charge current going to the second battery is routed by circuit 600 through resistor 641 and resistor 649 in parallel, thus decreasing the voltage across these resistors and increasing the amperage or magnitude of the charge current such that the second battery may be fully charged in a relatively short amount of time. In some embodiments, the second battery is being charged whenever rechargeable battery pack 100 is connected to an external power source. Thus, the second battery may be charged in one of two states: either a fast charge mode or a slow or low charge mode, as will be further explained below.

In an embodiment where the electronic device is a device that is configured to play audio recordings, such as an MP3 player, such as an iPod™ device manufactured by APPLE COMPUTER, as an example, resistor 641 has a resistance of between approximately 0.15 and 0.25 ohms, and power limiting switch 630 is off when a voltage drop across resistor 646 is greater than approximately 0.059 volts, and on when the voltage drop is less than that approximate value. Alternatively, a voltage drop of some other magnitude may be used, and the resistances of resistors 642, 643, 644, and 645 may be altered from the values disclosed herein, and may be selected such that the output of the current sense block remains substantially unchanged.

The foregoing components of circuit 600 are, in some embodiments, part of a sub-circuit 601. Still referring to FIG. 6, circuit 600 may further comprise a sub-circuit 602, which may set the battery charge current for the second battery. The power limiting capabilities of rechargeable battery pack 100 may be facilitated by a chip 690 that may dynamically detect a change in the current-sense portion of circuit 600. In some embodiments, the current-sense portion of circuit 600 may set the magnitude of the charge current for chip 690. By sensing the current supplied to the electronic device, resistor 641 may be switched in and out, as described above, in order to change the magnitude of the battery charge power supplied to the second battery. As mentioned above, in some embodiments, chip 690 sets the magnitude of the charge current, for example, either to a fast charge mode or a low charge mode. As an example, the fast charge mode may be enabled when the current through resistor 646 is less than or equal to approximately 0.27 amps, which may happen when the electronic device is drawing relatively lesser amount of current. Continuing the example, the low charge mode may be enabled when the current through resistor 646 is greater than approximately 0.27 amps, which may happen when the electronic device is drawing a relatively greater amount of current. In a particular embodiment, in fast charge mode, Vcc_BAT+ coming out of chip 690, which is the charge current for the second battery, is approximately equal to 0.55 amps, while in low charge mode Vcc_BAT+ is approximately equal to 0.1 amp. In a particular embodiment, resistor 641 is connected to pins 2, 3, and 5 of chip 690. The VCC_9V may be connected to pins 4, 8, and 9 of chip 690, and the VCC_BAT+ may be connected to pins 17, 18, and 19 of chip 690.

FIGS. 7a, 7b, and 7c illustrate an example of a second circuit which may be, for example, configured to power an electronic device with a second battery when a rechargable battery pack is electrically decoupled from an external power source. In some embodiments, this second circuit may be configured to power the electronic device with the external power source when the rechargeable battery pack is electrically coupled to the external power source. The embodiment illustrated comprises sub circuits illustrated in FIGS. 7a, 7b, and 7c, which may be separate or interconnected. Referring first to FIG. 7b, in the particular embodiment illustrated, a transistor 710 having a terminal 711 is electrically coupled to an input of the first battery, a transistor 720 having a terminal 721 is electrically coupled to an output of the second battery, a third transistor 730 having a terminal 731 is electrically coupled to the external power source, and a resistor 740 is electrically coupled to a terminal 732 of transistor 730. Particular embodiments include a capacitor 765 and a resistor 770 electrically coupled to a terminal 712 of transistor 710, and a diode 780 electrically coupled to a terminal 713 of transistor 710. Referring to FIG. 7a, the embodiment illustrated further comprises a diode 750 electrically coupled to a terminal 722 of transistor 720, a capacitor 755 and a resistor 760 electrically coupled to diode 750. Some embodiments may include one or more filters, which may be RC filters, and may filter power supplied to the electronic device. For instance, capacitor 755 and resistor 760 may be a filter. Capacitor 765 and resistor 770 may also be a filter. In some embodiments, a plurality of filters may form a filter block.

In one embodiment, diode 750 may be part number D8 BAT54C, capacitor 755 may have a capacitance of 1 micro Farad, resistor 760 may have a resistance of 10 M ohms, and transistor 720 may have part number Q15 ZXMP3A13F, for example. In a particular embodiment, capacitor 765 may have a capacitance of 1 micro Farad, diode 780 may be part number D2 CMS04, resistor 770 may have a resistance of 5.1 M ohms, and transistor 710 may be part number Q14 ZXMP3A13F, for instance. Resistor 740 may have a resistance of 255 K ohms, and transistor 730 may have part number Q1 ZXMP3A13F, also as examples.

In the embodiment where the electronic device is a device that is configured to play audio recordings, such as an MP3 player, such as an iPod™ device manufactured by APPLE COMPUTER, for example, the external power source may be a FireWire port on a computer, and resistances of resistors 740, 760, and 770 may be, respectively, between 200 and 300 kilohms, between 9.5 and 10.5 megohms, and between 4.9 and 5.3 megohms. In the same embodiment, a capacitance of capacitor 755 and a capacitance of capacitor 765 may both be between 0.5 and 2.0 microfarads. In the same or another embodiment, diode 750 may be a Schottky diode, such as the BAT54C diode manufactured by FAIRCHILD SEMICONDUCTOR of South Portland, Me., diode 780 may be a different Schottky diode, such as the CMS04 diode manufactured by TOSHIBA CORPORATION of Tokyo, Japan, and transistors 710, 720, and 730 may be field effect transistors such as the ZXMP3A13F transistor manufactured by ZETEX SEMICONDUCTOR of Manchester, England.

The line labeled Vcc_Vout_FW coming from transistor 720 may represent a power input to the electronic device coming from the second battery, which occurs, in certain embodiments, when rechargeable battery pack 100 is in the second condition. The line labeled Vcc_Vout_FW coming from transistor 710 may represent a power input to the electronic device, for example, coming from the external power source, which occurs, in some embodiments, when rechargeable battery pack 100 is in the first condition.

In some embodiments, transistors 720 and 730 (illustrated in FIG. 7c) may be off when rechargeable battery pack 100 is in the first condition, and may be on when rechargeable battery pack 100 is in the second condition. Continuing the same example, transistor 710 may be on when rechargeable battery pack 100 is in the first condition, and off when rechargeable battery pack 100 is in the second condition. In this embodiment, when the external power source is disconnected from rechargeable battery pack 100 (after earlier being connected), capacitor 755 will slowly discharge, eventually turning on transistor 720 and allowing the electronic device to receive power from the second battery. During this condition, transistor 730 may be on, and resistor 740 may be detectable by the electronic device. In this embodiment, when the electronic device detects resistor 740, the electronic device reacts by drawing power from the second battery, and by ceasing any charging of the first battery. When rechargeable battery pack 100 is electrically coupled to the external power source, transistors 720 and 730 may turn off, and transistor 710 may slowly turn on, thus causing the electronic device to re-check ACC line 790, since power has been removed for a short period of time. In certain embodiments, with transistor 730 turned off, resistor 740 cannot be detected by the electronic device, and the electronic device will thus be permitted to charge the first battery using power from the external power source.

Figure 8:
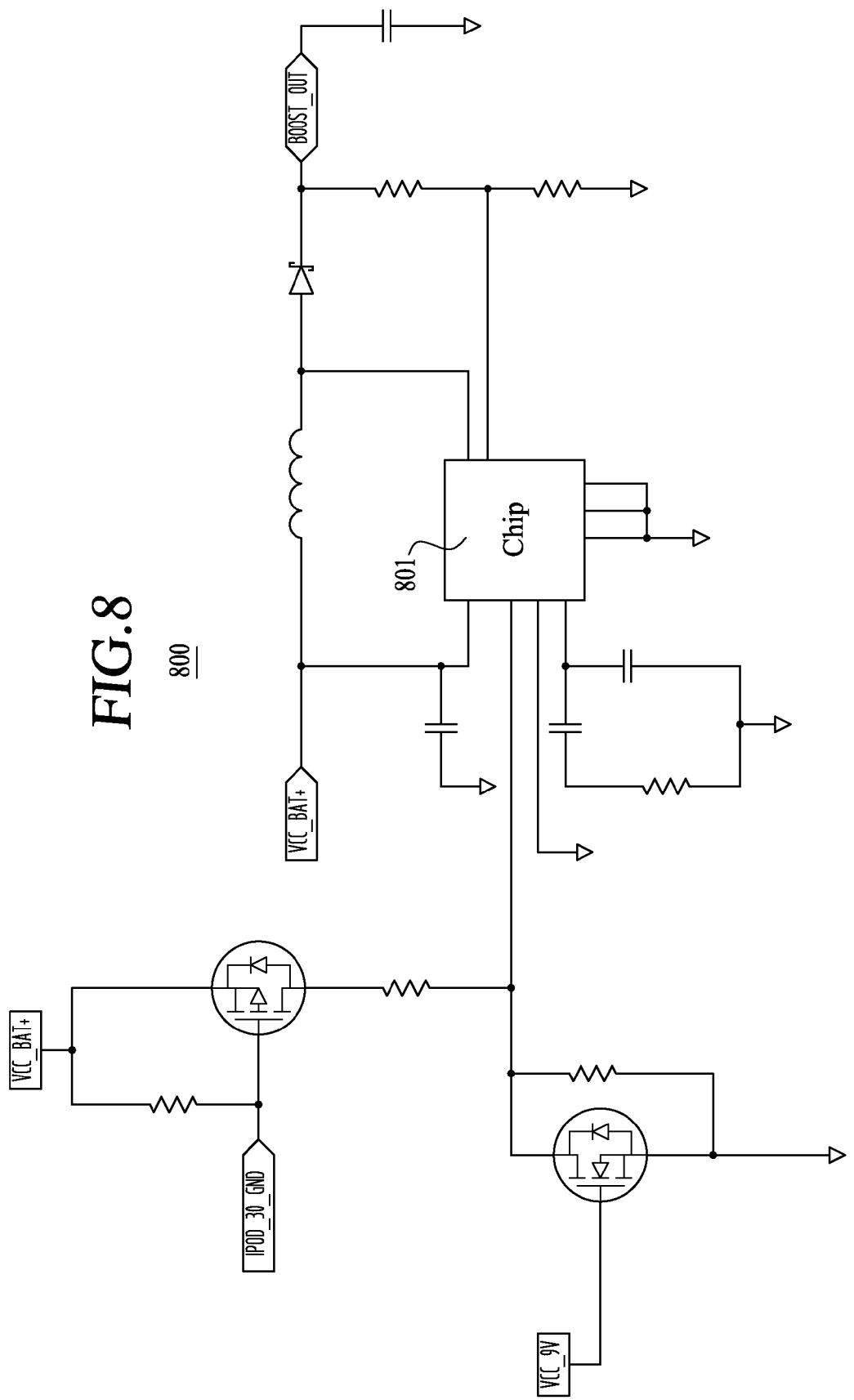
FIG. 8 is a circuit diagram showing a boost supply circuit according to an embodiment of the invention.

FIG. 8 is a circuit diagram showing a boost supply circuit 800 that is an example of such a circuit that may be included in some embodiments of the invention. Boost supply circuit 800 is a boost (or Step-Up) switching regulator. The voltage of the second battery may be boosted to a voltage in the range of the FireWire Specification, for example. In one embodiment, that voltage is approximately 9.3 volts. Chip 801 may be made by LINEAR TECHNOLOGY of Milpitas, Calif. The boost may be enabled only when connected to an electronic device, such as an iPod™ device, and the VCC_9V is not present (i.e. the electronic device is not connected to an external power source). The dock connector of the iPod™ device, for example, may have multiple ground pins, all of which may be connected internally to the iPod™ device. One of these ground pins may be used to detect when the iPod™ device is connected in order to enable the boost supply. Whenever VCC_9V is present, the boost supply may be disabled, which may be independent of whether the iPod™ device is connected. In some embodiments, switches may be used to enable/disable the boost supply based on the above criteria.

Referring back to FIGS. 1 and 2, in the embodiment illustrated, body 110 comprises a gas gauge or charge level indicator 130, which in some embodiments includes an actuator button 131, a light pipe 132, and, not explicitly illustrated in the figures, first and second light sources inside body 110. In particular embodiments, charge level indicator 130 gives a visual approximation of the charge remaining in rechargeable battery pack 100, or of the approximate time remaining until rechargeable battery pack 100 can no longer supply sufficient electric power to operate the electronic device. In this particular embodiment, to operate charge level indicator 130, actuator button 131 is actuated, which, depending on the remaining charge level or time, causes one or both of the first and second light sources to illuminate. In one embodiment, actuator button 131, when actuated, causes one or both of the first and second light sources to stay lit for a limited period of time, such as, for example, three seconds.

In one embodiment, actuator button 131 sets in motion a chain of events that eventually cause: (1) the green light source to illuminate when a remaining charge level of rechargeable battery pack 100 exceeds a first charge level; (2) the red light source to illuminate when the remaining charge level of rechargeable battery pack 100 is less than a second charge level; and (3) both the green light source and the red light source to illuminate, such that the green light source and the red light source emit light at the same time, when the remaining charge level of rechargeable battery pack 100 is equal to or less than the first charge level and is also equal to or greater than the second charge level. In some embodiments, the mixture of the green light and the red light creates light of a whitened yellowish orange color that will be referred to herein as amber. More specifically, in some embodiments, actuator button 131 activates a circuit inside rechargeable battery pack 100 that determines the remaining charge level of rechargeable battery pack 100 and then causes either or both of the green light and the red light source to illuminate as described.

As an example, the first charge level may be defined as 75 percent of full charge, and the second charge level may be defined as 25 percent of full charge. In this example, a green light and a red light indicate, respectively, a relatively high and a relatively low remaining charge level, while an amber light indicates a remaining charge level somewhere in between. It should be understood that in some embodiments, the first and second charge levels may alternatively be defined as percentages of full charge other than the percentages given in the foregoing example, may be defined in terms of approximate time remaining until rechargeable battery pack 100 is no longer able to supply sufficient power to operate an electronic device.

Recall from above that the battery inside rechargeable battery pack 100 is referred to from time to time herein as the second battery. The second battery may be a lithium-ion battery, for example. In certain embodiments, the second battery comprises two lithium-ion batteries electrically connected in series. In some embodiments, in order to prevent damage to rechargeable battery pack 100, or to the second battery, the second battery is turned off or disconnected from being drained or used as a power source when the charge level of the second battery reaches a certain minimum threshold level, which will be referred to as a first threshold level. The first threshold level may be measured as a voltage across the terminals of the second battery, for instance. In one embodiment, the first threshold level is approximately 5.4 volts, but in other embodiments different first threshold levels may be used. In particular embodiments, the second battery is not turned on to be drained or used as a power source, once it has been turned off, until after a charge voltage is applied to the second battery, for example, from an external power source. In other embodiments, the second battery is not turned on to be drained or used as a power source, once it has been turned off, until after the charge level reaches a second threshold level that is higher than the first threshold level.

Further, in certain embodiments, the charge current to the second battery may be turned off or stopped once the second battery is fully charged. In particular embodiments, for example, the second battery will be charged, either fast or trickle, until a third threshold level is reached. This third threshold may be, for example, 8.4 volts, in certain embodiments, which may be measured across the terminals of the second battery, for example. In other embodiments, different threshold levels may be used. In some embodiments, a constant voltage may be applied as the second battery is being charged, during at least part of the charging cycle, and the charging rate of the second battery may gradually decrease as the voltage of the second battery approaches this constant voltage. In such embodiments, the constant voltage may be the third threshold level, for example.

In one embodiment, the first and second light sources emit light at a constant intensity whenever they are actuated. In another embodiment, the light sources are capable of emitting light at variable intensity. As a first example of the variable intensity embodiment, the light sources may be capable of emitting light at discrete intensity levels, such as at full intensity, half intensity, and zero intensity. The visual result in this first example is very similar to that described above. As a second example of the variable intensity embodiment, the light sources may be capable of emitting light in a continuous range of intensity levels, such that the intensity of light emitted by the light sources changes smoothly across the entire range from full intensity to zero intensity. In this second example, as the remaining charge level in rechargeable battery pack 100 changes from full to zero, the light seen through light pipe 132 changes smoothly along a continuum from bright green, through yellow-green, amber, and reddish-amber, and finally to red. A more accurate indication of the remaining charge level may be possible in this second example, due to the greater number of light intensities used. In a particular embodiment, less than 20 minutes may remain when the light is fully red. If battery pack 100 is to be stored for a long time without being used, in embodiments where the second battery is a lithium-ion battery, a reduction of capacity may be avoided by storing battery pack 100 when charge level indicator 131 is red. Loss of capacity may further be avoided, in particular embodiments, by charging battery pack 100 for 10 to 15 minutes every six months during long-term storage.

FIG. 9 is a circuit diagram illustrating an LED gas gauge circuit 900 according to an embodiment of the invention. Circuit 900 may provide functionality for charge level indicator 130 illustrated in FIGS. 1 and 2, for example. In some embodiments, the LEDs are illuminated in the following two scenarios: (1) actuator button 131 is actuated; or (2) the second battery is being charged. When actuator button 131 is actuated, the LED circuit may, in the embodiment illustrated, be powered for a time determined by the time constant produced by resistor 915 and capacitor 909. The LED circuit may also be powered when rechargeable battery pack 100 is plugged into an external power source. In this case, in a particular embodiment, the LEDs may be controlled by pin 14 of chip 690 (FIG. 6), only illuminating when one of the above two scenarios exists. In this embodiment, pin 14 is connected to the LED shown in FIG. 6. In some embodiments, when the second battery is fully charged, chip 690 may turn off the LEDs. In some embodiments, the LEDs may turn off when the second battery has been charged to approximately 90%, and the user may leave the battery pack 100 connected for 10 additional minutes, for example, after the LED turns off, to maximize the charge. But in these embodiments, disconnecting battery pack 100 from the power supply sooner, or leaving it connected, may not damage battery pack 100. In some embodiments, the LED may flash to indicate a fault. The user may be instructed to disconnect the external power supply for 30 seconds, for example, when the LED flashes.

An op-amp, voltage reference, and two transistors control the variable intensity of the red and green LEDs in one particular embodiment. There are various other ways to produce the effect of a gas gauge, which may be utilized in particular embodiments of the invention, and circuit 900 can be attained in various different ways. Further, the voltage thresholds can be set through changing the values of the resistors.

Figure 10:
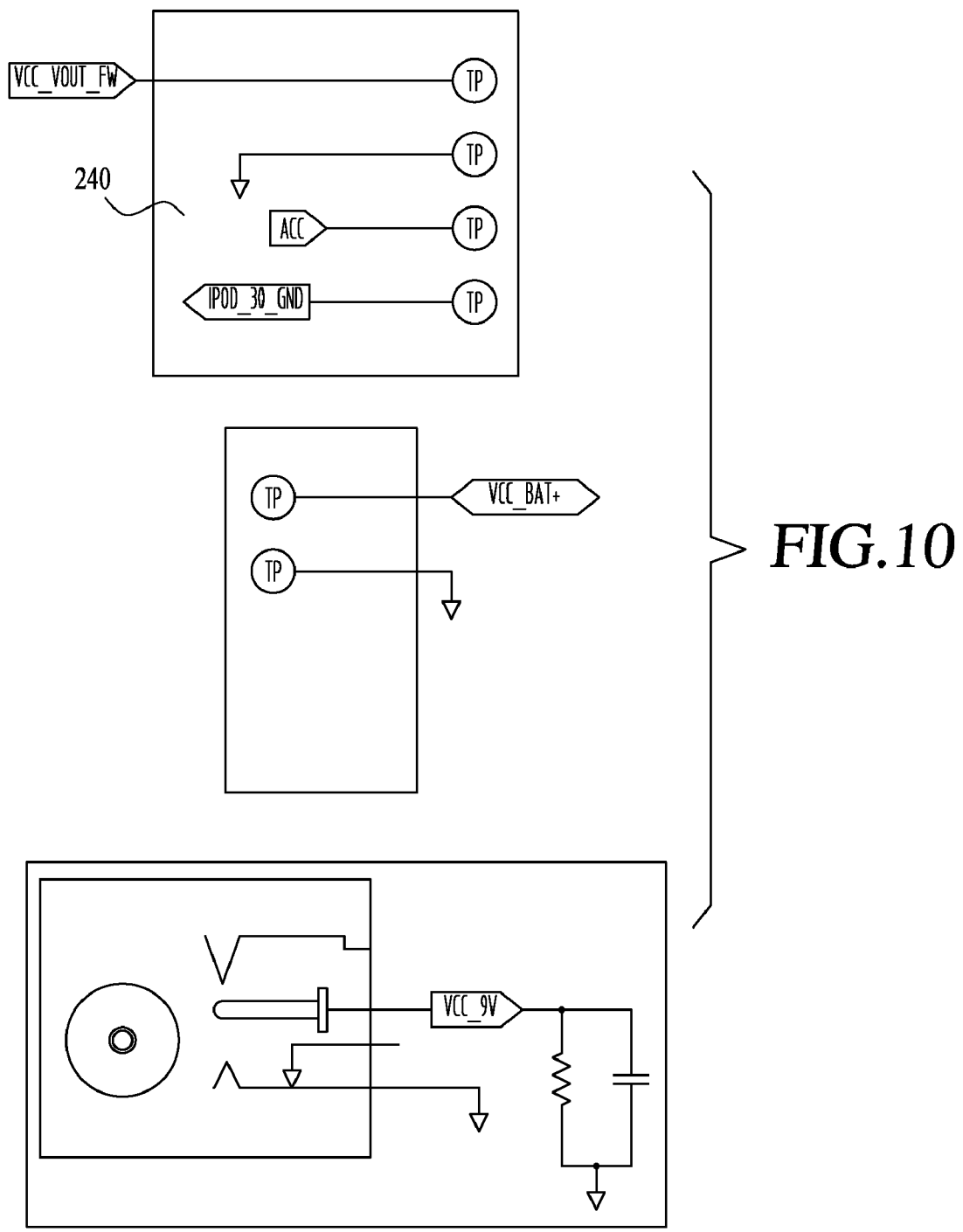
FIG. 10 is a diagram illustrating connections to a connector of the electronic device, to a battery terminal, and to a DC input jack on the rechargeable battery pack of FIG. 1, according to an embodiment of the invention.

FIG. 10 is a diagram illustrating an example of the connections to dock connector 240, to a battery terminal, and to a DC input jack on rechargeable battery pack 100 according to an embodiment of the invention. In FIG. 10, the top block may represent connections to an iPod dock connector, for example. The middle block may represent battery terminal connections. And the bottom block may illustrate DC input jack connections, for example, which may include a resistor having a resistance of 1 K ohms and a capacitor having a capacitance of 10 micro Farads in one embodiment.

In some embodiments, the DC input jack is on top of battery pack 100, for example, as shown in FIG. 1. The user may plug a DC pug end of a power cable (not shown) into the DC jack to charge battery pack 100, or may connect a Firewire, for example, from an AC wall charger. Such a Firewire may be provided with the electronic device, or may be from a port on a laptop or desktop computer, for example. As described herein, the first battery and second battery may be charged simultaneously in some embodiments, and the first battery may continue to charge after the second battery is fully charged. In particular embodiments, it may take about 2 hours to charge the first battery second battery, or both, with a fast charge. Some embodiments, such as an iPod™ mini device, may take only one hour. In some embodiments it may take 4 hours for a full charge. The fast charge may provide 80% of a full charge, as an example. The user may disconnect battery pack 100 from the electronic device, for example, at dock connector 240, or may turn off the electronic device when the electronic device is not in use to conserve the charge of battery pack 100 or the second battery.

FIG. 10 further illustrates an example of a disconnectable electrical connection that in some embodiments may be present between a device such as rechargeable battery pack 100, and an electronic device, such as a portable electronic device, which, in some embodiments, may have a battery, may be configured to play audio recordings, or both, or specifically, may be an MP3 player. As mentioned above, such an electrical connection may be located inside an extension, which may protect the connection from damage.

Figure 11:
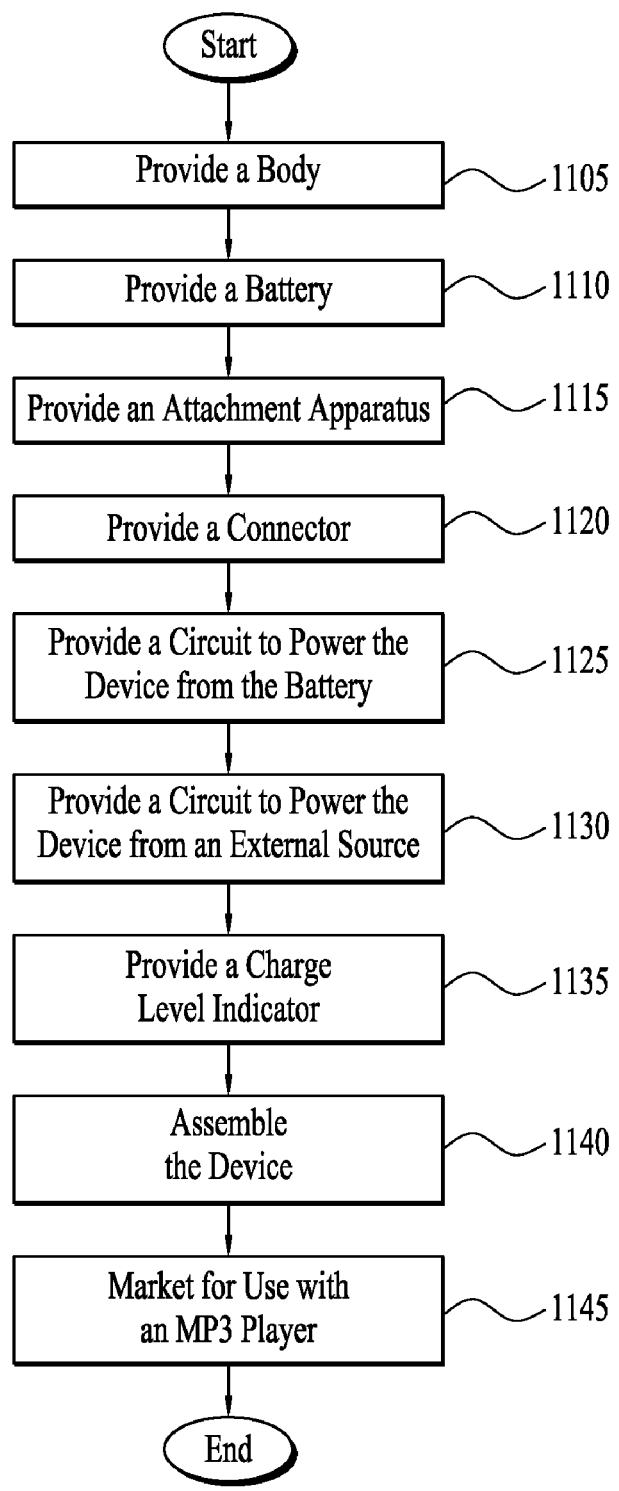
FIG. 11 is a flow chart illustrating a method of making and marketing a battery pack according to an embodiment of the invention.

FIG. 11 illustrates an example of a method in accordance with the invention, method 1100, which includes manufacturing a power supply system or device such as a battery pack. A power supply system may be capable of providing electric power to an electronic device, which may have a (first) battery. Method 1100 may include, in some embodiments, not necessarily in the order presented herein, at least the steps of providing a body (step 1105) and providing a battery (step 1110), for example, the second battery described herein, which may be located within the body. Various methods may also include providing an attachment apparatus (step 1115), which, in some embodiments, may be configured to at least partially surround and attach to the battery pack and the electronic device. Method 1100 may also include the step of providing an electrical connector (step 1120), which may be configured to electrically connect the battery pack and the electronic device. In some embodiments, the step of providing an attachment apparatus (step 1105) includes providing an extension projecting from the attachment apparatus and configured to at least partially surround and protect the electrical connector.

In particular embodiments, method 1100 may include the step of providing at least one circuit located within the body and configured to perform at least one of a number of functions. Such functions may include, for example, powering the electronic device from the second battery (step 1125), which may take place when the battery pack is connected to the electronic device and no external power source is connected to the battery pack, for example. Another function that may be performed by a circuit that is provided, is to power the electronic device from an external power source (step 1130). In some embodiments, one or more circuits may be provided that charge both the first battery and the second battery from the external power source when the battery pack is connected to the electronic device and the external power source is connected to the battery pack. In some embodiments, a circuit may be provided that is configured to charge the second battery at one of at least two non-zero rates of charge based on a power consumption level of the electronic device, for example. In such embodiments, the power may be provided by the external power source, for instance. Method 1100 may further include, in various embodiments, the step of providing a charge level indicator (step 1135), for example, on the battery pack.

The various components provided in method 1100 may be similar or identical to the various components described herein. Thus, the components described in detail herein may serve as examples of certain embodiments of the components provided in method 1100. In different embodiments, steps 1105 through 1135 may be performed in a different sequence than what is illustrated.

Once the various components are provided, the system or device may be assembled (step 1140), which may include various activities that would be familiar to a person of ordinary skill in the art. In certain specific embodiments, various methods in accordance with the invention may further include the step of marketing the power supply system (step 1145). The battery pack, attachment apparatus, or both, may be marketed for use with an electronic device, for instance, configured to play recordings, or specifically, for use with an MP3 player, such as an iPod™ device. Marketing may include advertising, packaging, displaying in retail outlets, and the like.

Although the invention has been described with reference to specific embodiments, it will be understood by those skilled in the art that various changes may be made to certain embodiments without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the rechargeable battery pack and the attachment apparatus discussed herein may be implemented in a variety of embodiments, and that the foregoing discussion of certain of these embodiments does not necessarily represent a complete description of all possible embodiments.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A rechargeable battery pack configured to power an electronic device having a first battery,
   the rechargeable battery pack comprising:
   a second battery;
   an external power input port configured to couple to an external power source;
   a power output port for powering the electronic device; and
   a first circuit comprising:
      a first power path between the external power input port and the power output port of the rechargeable battery pack;
      a second power path between the second battery and the power output port of the rechargeable battery pack; and
      a power switch set;
   wherein:
      the first circuit is internal to the rechargeable battery pack;
      the rechargeable battery pack, along with its second battery, external power input port, power output port, and first circuit, is external to and distinct from the electronic device;
      the second battery of the rechargeable battery pack is supplemental to the first battery of the electronic device;
      if the external power source is not coupled to the external power input port of the rechargeable battery pack:
         the first power path is disabled by the power switch set; and
         the second power path is enabled by the power switch set;
      and
      if the external power source is coupled to the external power input port of the rechargeable battery pack:
         the first power path is enabled by the power switch set; and
         the second power path is disabled by the power switch set.

2. The rechargeable battery pack of claim 1, further comprising:
   an identification path configured to indicate a presence of the rechargeable battery pack to the electronic device; and
   an identification switch coupled to the identification path;
   wherein:
      the identification switch is internal to the rechargeable battery pack;
      the identification switch is distinct from the power switch set;
      when the external power source is decoupled from the external power input port of the rechargeable battery pack:
         the identification path is enabled for the electronic device by the identification switch;
      and
      when the external power source is coupled to the external power input port of the rechargeable battery pack:
         the identification path is disabled for the electronic device by the identification switch.

3. The rechargeable battery pack of claim 2, wherein:
   the identification path comprises a resistance; and
   the resistance is detectable by the electronic device, as indicative of the presence of the rechargeable battery pack, when the identification path is enabled by the identification switch.

4. The rechargeable battery pack of claim 2, wherein:
   the identification switch comprises:
      a control terminal coupled to the external power source;
      a second terminal coupled to a first portion of the identification path; and
      a third terminal coupled to a second portion of the identification path;
   the resistance is located at the first portion of the identification path between the second terminal of the identification switch and a ground path;
   when the identification path is enabled, the first and second portions of the identification path are coupled together by the identification switch; and
   when the identification path is disabled, the first and second portions of the identification path are decoupled from each other by the identification switch.

5. The rechargeable battery pack of claim 1, wherein:
   the power switch set comprises a switch having:
      a first terminal coupled to the power output port;
      a second terminal coupled to the external power input port; and
      a control terminal coupled to the external power input port.

6. The rechargeable battery pack of claim 5, wherein:
when the external power input port is coupled to the external power source, the control terminal of the switch is actuated to couple the external power input port to the power output port and thereby enable the first power path.

7. The rechargeable battery pack of claim 5, wherein:
the first circuit comprises at least two of:
a capacitor coupled between the control terminal of the switch and the external power input port;
a resistor coupled between the control terminal of the switch and a ground path; or
a diode coupled between the second terminal of the switch and the external power input port.

8. The rechargeable battery pack of claim 1, further comprising:
the power switch set comprises a switch having:
a first terminal coupled to the power output port;
a second terminal coupled to the second battery; and
a control terminal coupled to the external power input port.

9. The rechargeable battery pack of claim 8, wherein:
when the external power input port is decoupled to the external power source, the control terminal of the switch is actuated to couple the second battery to the power output port and thereby enable the second power path.

10. The rechargeable battery pack of claim 8, wherein:
the first circuit comprises at least two of:
a resistor coupled between a first node and a ground path, the first node coupled to the external power input port;
a capacitor coupled between the first node and the ground path; or
one or more diodes coupled between the external power input port and the first node;
the first node being coupled to the control terminal of the switch.

11. The rechargeable battery pack of claim 1, further comprising:
a switching regulator coupled between the second battery and the second power path.

12. The rechargeable battery pack of claim 1, further comprising:
a body comprising:
the second battery; and
the power output port;
wherein the external power input port and the power output port are accessible via one or more walls of the body.

13. The rechargeable battery pack of claim 1, further comprising:
a second circuit configured to:
charge the second battery with a charge current from the external power source; and
toggle the charge current for the second battery between at least two non-zero magnitudes based on a power consumption level of the electronic device.

14. The rechargeable battery pack of claim 1, wherein:
the power switch set comprises:
a first switch having:
a first terminal coupled to the power output port;
a second terminal coupled to the external power input port; and
a control terminal controlled by the external power input port;
and
a second switch having:
a first terminal coupled to the power output port;
a second terminal coupled to the second battery; and
a control terminal controlled by the external power input port;
wherein:
when the external power input port is coupled to the external power source:
the control terminal of the first switch is actuated to couple the external power input port to the power output port and thereby enable the first power path; and
the control terminal of the second switch is deactuated to decouple the second battery from the power output port and thereby disable the second power path;
and
when the external power input port is decoupled to the external power source:
the control terminal of the first switch is deactuated to decouple the external power input port from the power output port and thereby disable the first power path; and
the control terminal of the second switch is actuated to couple the second battery to the power output port and thereby enable the second power path.

15. The rechargeable battery pack of claim 1, further comprising:
an attachment apparatus configured to at least partially surround and attach to:
a body of the rechargeable battery pack; and
the electronic device;
an electrical connector configured to electrically connect the rechargeable battery pack to the electronic device; and
an extension projecting from the attachment apparatus and configured to at least partially surround and protect the electrical connector.

16. A method for providing a rechargeable battery pack configured to power an electronic device having a first battery, the method comprising:
providing a second battery supplemental to the first battery;
providing an external power input port configured to couple to an external power source;
providing a power output port for powering the electronic device;
providing a first circuit comprising:
a first power path between the external power input port and the power output port of the rechargeable battery pack;
a second power path between the second battery and the power output port of the rechargeable battery pack; and
a power switch set;
and
providing a body of the rechargeable battery pack, the body comprising:
the second battery, the external power input port, the power output port, and the first circuit;
wherein:
the rechargeable battery pack and the body are external to the electronic device; and
providing the first circuit comprises:
providing the power switch set to both enable the second power path and disable the first power path if the external power source is not coupled to the external power input port of the rechargeable battery pack; and
providing the power switch set to both enable the first power path and disable the second power path if the external power source is coupled to the external power input port of the rechargeable battery pack.

17. The method of claim 16, further comprising:
providing an identification switch coupled along an identification path for the electronic device;
wherein:
the identification switch is internal to the rechargeable battery pack;
the identification switch is distinct from the power switch set;
the identification switch enables the identification path, when the external power source is decoupled from the external power input port of the rechargeable battery pack, to permit the electronic device to detect a resistance indicative of the presence of the rechargeable battery pack;
and
the identification switch disables the identification path when the external power source is coupled to the external power input port of the rechargeable battery pack.

18. The method of claim 16, wherein:
providing the first circuit comprises:
providing a switch of the power switch set to comprise:
a first terminal coupled to the power output port;
a second terminal coupled to the external power input port; and
a control terminal coupled to the external power input port;
and
providing the switch to enable the first power path, when the external power input port is coupled to the external power source, by coupling the external power input port to the power output port.

19. The method of claim 16, wherein:
providing the first circuit comprises:
providing a switch of the power switch set to comprise:
a first terminal coupled to the power output port;
a second terminal coupled to the second battery; and
a control terminal coupled to the external power input port;
and
providing the switch to enable the second power path, when the external power input port is decoupled form the external power source, by coupling the second battery to the power output port.

20. The method of claim 16, wherein:
providing a second circuit configured to:
charge the second battery with a charge current from the external power source; and
toggle the charge current for the second battery between at least two non-zero magnitudes based on a power consumption level of the electronic device.

21. A rechargeable battery pack configured to power an electronic device having a first battery, the rechargeable battery pack comprising:
a second battery supplemental to the first battery when the first battery is coupled to the electronic device; and
a first circuit coupled to the second battery and configured to dynamically change a charge current supplied from an external power source to the second battery based on a power consumption level of the electronic device;
wherein:
the first circuit is internal to the rechargeable battery pack;
the rechargeable battery pack, along with its second battery, and first circuit, is external to and distinct from the electronic device;

the charge current comprises a first portion and a second portion less than the first portion;
the first circuit comprises:
a current sense subcircuit configured to measure a power consumption level of the electronic device;
a switch having a first terminal electrically coupled to an output of the current sense subcircuit;
a first path coupled to a second terminal of the switch and configured to transmit the first portion of the charge current to the second battery; and
a second path configured to transmit the second portion of the charge current to the second battery when the external power source is coupled to the first circuit;
when the power consumption level is greater than a second level:
the switch is disabled via the output of the current sense subcircuit to restrict a transmission of the first portion of the charge current via the first path; and
when the power consumption level is less than a first level:
the switch is enabled via the output of the current sense subcircuit; and
the first portion of the charge current is transmitted to the second battery via the first path.

22. The rechargeable battery pack of claim 21, wherein:
the second level of the power consumption is greater than the first level of the power consumption.

23. The rechargeable battery pack of claim 21, wherein:
the first and second levels of the power consumption are substantially equal to each other.

24. The rechargeable battery pack of claim 21, further comprising:
a second circuit configured to:
power the electronic device with the second battery when the rechargeable battery pack is decoupled from the external power source; and
power the electronic device with the external power source when the rechargeable battery pack is coupled to the external power source.

25. The method of claim 17, wherein:
providing the identification switch comprises:
providing a control terminal configured to couple to the external power source;
providing a second terminal coupled to a first portion of the identification path; and
providing a third terminal coupled to a second portion of the identification path;
the resistance is located at the first portion of the identification path between the second terminal of the identification switch and a ground path;
when the identification path is enabled, the first and second portions of the identification path are coupled together by the identification switch; and
when the identification path is disabled, the first and second portions of the identification path are decoupled from each other by the identification switch.

26. The method of claim 18, wherein:
providing the first circuit comprises:
providing at least two of:
a capacitor coupled between the control terminal of the switch and the external power input port;
a resistor coupled between the control terminal of the switch and a ground path; or
a diode coupled between the second terminal of the switch and the external power input port.

27. The method of claim 19, wherein:
providing the first circuit comprises:
  providing at least two of:
    a resistor coupled between a first node and a ground path, the first node coupled to the external power input port;
    a capacitor coupled between the first node and the ground path; or
    one or more diodes coupled between the external power input port and the first node;
  the first node being coupled to the control terminal of the switch.

* * * * *